Feb. 27, 1934.　　　M. ACHTERHOF　　　1,949,068
ARTIFICIAL TURF AND METHOD OF MAKING THE SAME
Filed July 11, 1930
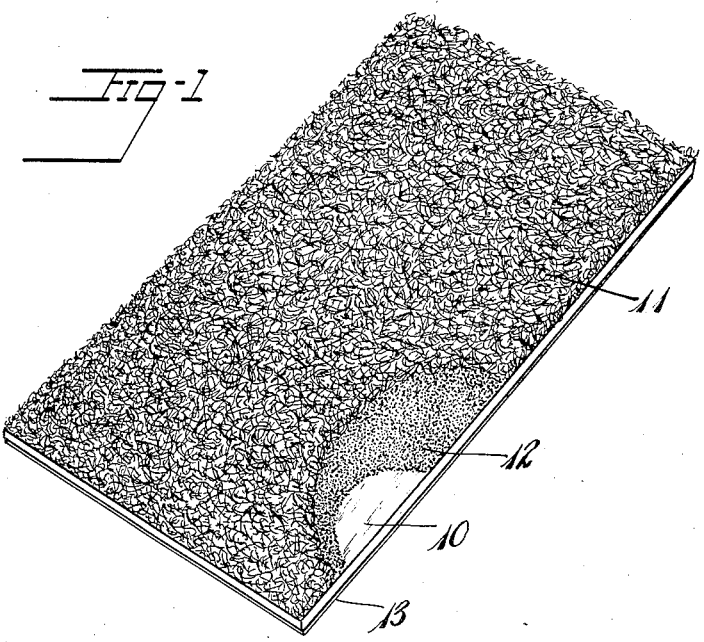
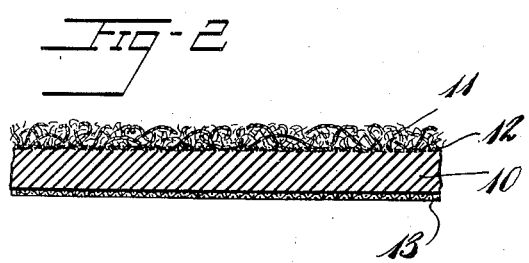

Patented Feb. 27, 1934

1,949,068

UNITED STATES PATENT OFFICE 1,949,068

ARTIFICIAL TURF AND METHOD OF MAKING THE SAME

Marvin Achterhof, Akron, Ohio, assignor to The B. F. Goodrich Company, New York, N. Y., a corporation of New York Application July 11, 1930. Serial No. 467,155

10 Claims. (Cl. 154—2)

This invention relates to artificial turf which may be used in situations where the use of natural turf is not practical, and where close simulation of the latter in appearance and surface characteristics is desired. It may be used, for example, in solariums, on porches, on the stage for theatrical settings, and for the putting greens of miniature golf courses.

The chief objects of the invention are to provide an improved product which closely simulates the appearance and mechanical characteristics of natural turf; to provide a product which may be satisfactorily made from reclaimed or inferior materials; to provide a product which may be made at relatively low cost; to provide adequate union of the respective elements of the article; and to provide an improved method of making artificial turf.

Of the accompanying drawing:

Fig. 1 is a perspective view of a portion of a sheet of the improved artificial turf, parts being broken away.

Fig. 2 is a sectional view of the artificial turf, on a larger scale.

Referring to the drawing, the invention consists of sheet material comprising a body structure 10, a layer or facing 11 of fibrous material which in appearance and texture resembles grass, and a layer of bonding material 12 securing the fibrous layer 11 to the body structure 10. The latter preferably is flexible, and preferably is composed of rubber, rubber and fiber, or rubberized fabric, and, if made entirely of rubber, may be provided with a backing of burlap 13 or other suitable woven fabric.

The body structure 10 preferably is vulcanized before the bonding material 12 and facing layer 11 are applied thereto.

The facing layer 11 consists of fibrous material, and preferably is obtained from material which previously has been rubberized, such as worn out pneumatic tires, or unvulcanized fabric trimmings, known as uncured scrap, which is a by-product of pneumatic tire manufacture.

When the fibrous material is obtained from old tire casings, the latter are chopped up, and then either shredded or beaten to loosen the rubber particles, which subsequently are removed by sifting or winnowing.

When fibers from uncured scrap are used the fibers are separated from the rubber preferably by the method known as mill washing wherein the material is passed between mill rolls in the presence of water which washes away the fibers as they become loosened from the plastic mass of material, while leaving a large proportion of them in twisted form.

Each of the methods mentioned removes most of the rubber from the fibers, there remaining therein but a small amount of rubber (about 5 percent) which it is impractical to remove, and which I find to be advantageous in the manufacture of artificial turf.

The highest quality of product is produced from the fibrous material having a high percentage of twisted threads, which, because of their thickness and because of the rubber remaining in them, do not fray, and have sufficient stiffness to resist matting and packing down, with the result that an excellent simulation of grass is effected.

The material preferably is dyed green before its application to the body structure, and I find that its small rubber content does not interfere with its absorption of the dye to provide a satisfactory product.

The bonding material 12 preferably is rubber cement, and it is applied to the body structure 10 preferably after the latter has been vulcanized. The fibrous material constituting the facing layer 11 is then applied by distributing it evenly over the cemented surface of the body structure, preferably before the cement has dried, and lightly pressing it thereagainst. The cement is then allowed to dry, after which the fibrous layer is lightly brushed to remove any material not adhered to the body structure. Preferably the cement includes ingredients which cause the rubber therein to vulcanize after a short interval, without artificial application of heat, so that the fibers are vulcanized to the body 10 in the finished product.

In addition to preventing fraying of the strands of fibrous material and adding rigidity thereto, the small amount of rubber in the strands improves their adhesion to the body structure so that but few strands are loosened therefrom even after they are repeatedly trod upon.

Modifications may be resorted to within the scope of the appended claims as I do not limit my claims wholly to the specific construction or exact procedure shown and described.

I claim:

1. Artificial turf comprising a body structure of sheet form comprising rubber, a thick nap bonded to one face thereof and comprising fibers in random arrangement simulating grass, and rubber particles interspersed in and adhered to the fibers.

2. Artificial turf comprising a body structure of sheet form comprising rubber, a thick nap bonded to one face thereof by a vulcanized rubber adhesive and comprising fibers in random arrangement simulating grass, and rubber particles interspersed in and adhered to the fibers.

3. Artificial turf comprising a flexible body structure of sheet form and a facing layer simulating grass and comprising short pieces of unwoven, twisted, strand material containing a small percentage of rubber.

4. Artificial turf comprising a body structure of sheet form comprising rubber, a thick nap bonded to one face thereof and comprising dyed fibers in random arrangement simulating grass, and rubber particles interspersed in and adhered to the dyed fibers.

5. Artificial turf comprising a body structure of sheet form, and a facing layer of short, unwoven, twisted strands containing a small percentage of rubber bonded to a surface thereof by a vulcanized rubber adhesive.

6. The method of making artificial turf which comprises removing the major portion of the rubber from previously rubberized fibrous material, and then adhering the fibrous material to sheet material in simulation of grass.

7. The method of making artificial turf which comprises comminuting rubberized fibrous material comprising twisted strands, removing the major portion of the rubber therefrom without eliminating the twist of the strands, and attaching the material thus obtained to one side of sheet material in simulation of grass.

8. A method as defined in claim 7 in which the fibrous material is attached to the sheet material by bonding it thereto with rubber.

9. The method of making artificial turf which comprises removing all but a small part of the rubber from previously rubberized fibrous material, dyeing the fibrous material thus obtained, and then adhering the fibrous material to the surface of sheet material in simulation of grass.

10. The method of making artificial turf which comprises removing all but a small part of the rubber from previously rubberized fibrous material comprising twisted strands, dyeing the fibrous material thus obtained, and then in simulation of grass bonding the dyed, fibrous material to sheet material comprising rubber.

MARVIN ACHTERHOF.